No. 691,151. Patented Jan. 14, 1902.
C. M. LEECH & S. D. EVANS.
DRIVING GEAR.
(Application filed Mar. 25, 1901.)
(No Model.) 2 Sheets—Sheet 1.
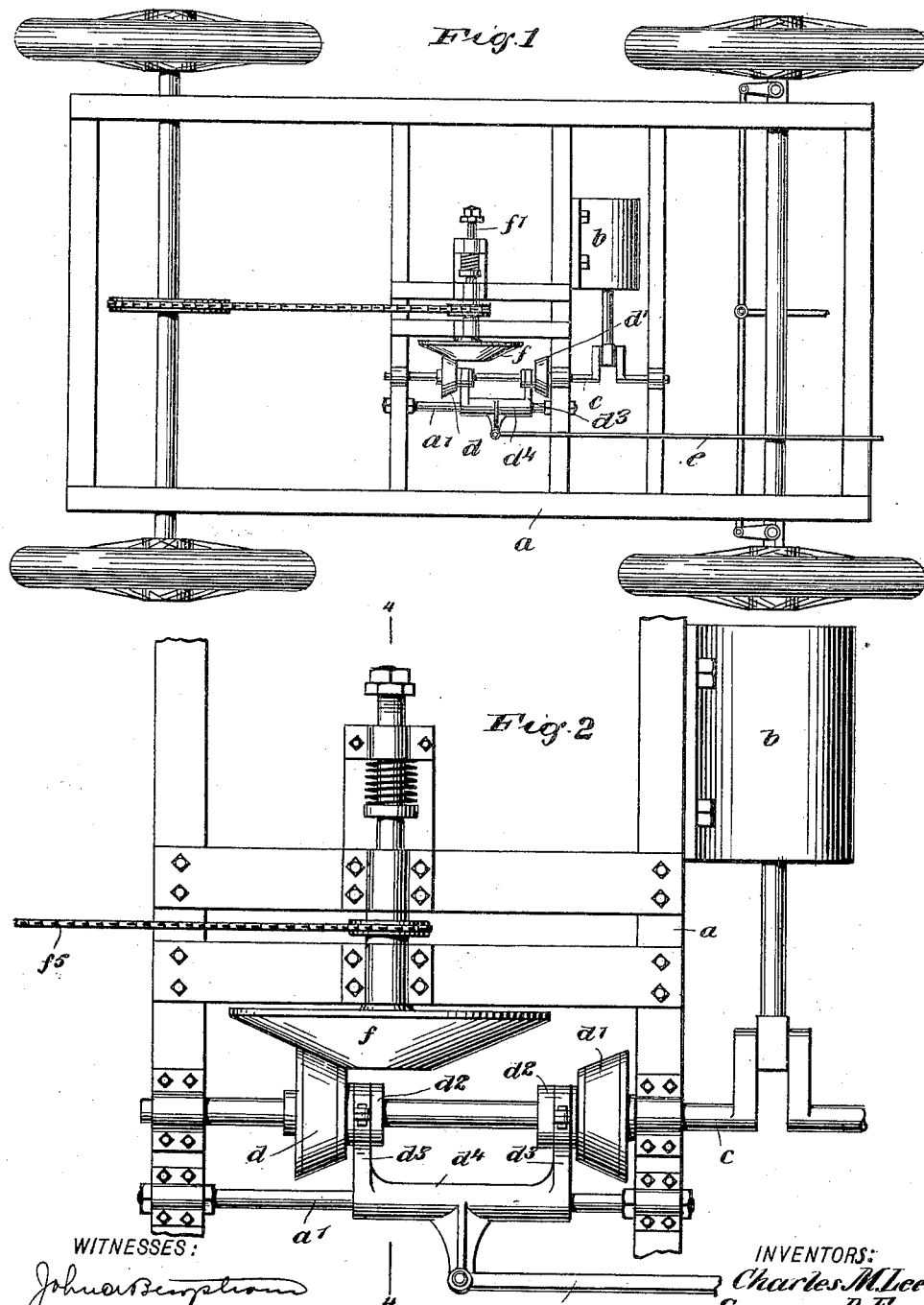

No. 691,151. Patented Jan. 14, 1902.
C. M. LEECH & S. D. EVANS.
DRIVING GEAR.
(Application filed Mar. 25, 1901.)
(No Model.) 2 Sheets—Sheet 2.
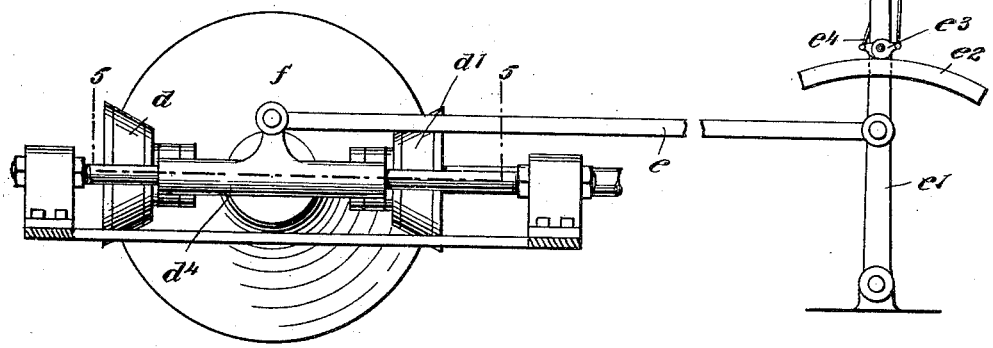
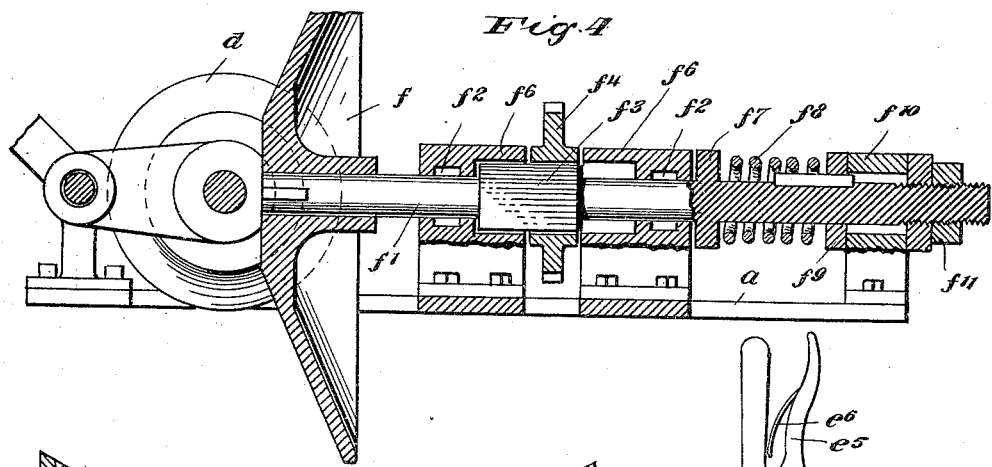
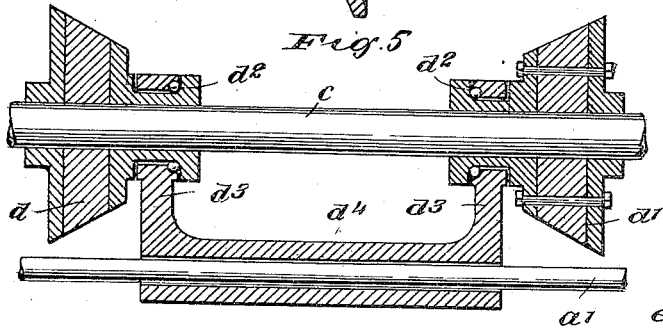
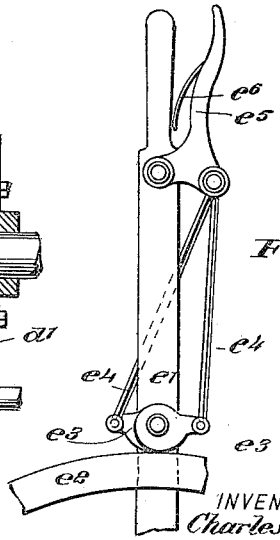
WITNESSES:
INVENTORS
Charles M. Leech
Seymour D. Evans
BY
ATTORNEYS

UNITED STATES PATENT OFFICE.

CHARLES M. LEECH AND SEYMOUR D. EVANS, OF LIMA, OHIO.

DRIVING-GEAR.

SPECIFICATION forming part of Letters Patent No. 691,151, dated January 14, 1902.

Application filed March 25, 1901. Serial No. 52,690. (No model.)

*To all whom it may concern:*

Be it known that we, CHARLES M. LEECH and SEYMOUR D. EVANS, citizens of the United States, and residents of Lima, in the county of Allen and State of Ohio, have invented a new and Improved Driving-Gear, of which the following is a full, clear, and exact description.

This invention relates to a frictional gearing for use on automobile vehicles, marine vessels, and in all other connections in which it is desirable to transmit a varying speed in one direction or the other.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is a plan view of the invention applied to an automobile vehicle. Fig. 2 is an enlarged plan view of the gear. Fig. 3 is a side elevation thereof. Fig. 4 is a section on the line 4 4 of Fig. 2. Fig. 5 is a section on the line 5 5 of Fig. 3, and Fig. 6 is a detail view of the lock device for the lever.

According to the arrangement which we have here illustrated, $a$ represents the frame of the vehicle to which the gear is applied. This frame may be of any form desired so long as it properly mounts the various parts.

$b$ indicates a motor, and $c$ indicates the shaft thereof, which is connected by a crank with the connecting-rod of the motor, as will be understood. On this shaft are splined two friction-pulleys $d$ and $d'$, such pulleys being in the form of a frustum of a cone and placed with their small ends facing each other. These pulleys are provided with collars $d^2$, connected with the arms $d^3$ of a shifter $d^4$, which is mounted to slide on a longitudinally-disposed bar $a'$, held by and forming part of the frame $a$.

The shifter $d^4$ has a link $e$ in connection therewith, and this link is connected with a hand-lever $e'$, fulcrumed on a suitable part of the frame of the vehicle, so that the hand-lever may be readily reached by the driver.

$e^2$ indicates a quadrant-bar, with which the lever $e'$ works, and acting with this quadrant-bar are two cams $e^3$, mounted on the lever $e'$ and disposed oppositely. These cams $e^3$ are connected by links $e^4$ with a finger-lever $e^5$, mounted on the upper end of the handle $e'$. By moving the finger-lever $e^5$ against the hand-lever $e'$ the cams $e^3$ are moved out of engagement with the quadrant $e^2$, and the hand-lever is then free to swing. A spring $e^6$ is applied to the finger-lever to throw it to outward position, thus locking the cams $e^3$ against the quadrant. By means of these devices the hand-lever may be locked on the quadrant at any point desired, and it may be adjusted to a very slight degree and securely held, which arrangement is therefore distinguished from the pawl-and-ratchet devices usually employed in this connection.

Working with the friction pulleys or wheels $d$ and $d'$ is a friction-wheel $f$, which is in the form of the frustum of a cone and which has a bearing-surface greater in area than that of either one of the wheels $d$ and $d'$. According to the arrangement here shown the working face of the friction-wheel $f$ is twice that of the working faces of the wheels $d$ and $d'$. This wheel $f$ is carried on a shaft $f'$, which is disposed at right angles to the shaft $a'$ and mounted to turn freely and also to yield axially in boxes $f^2$, fastened on the frame $a$. Intermediate the boxes $f^2$ the shaft $f$ is provided with a squared or other angularly-formed portion $f^3$, on which is slidably fitted a sprocket-wheel $f^4$. This sprocket-wheel is therefore caused to turn with the shaft $f'$ and is adapted to be connected by a chain or other suitable form of gear with the driving-axle of the vehicle. The boxes $f^2$ are provided with hoods or guards $f^6$ on their inner faces, which hoods are arranged to receive the enlargement $f^3$ of the shaft $f'$ as the shaft slides. This portion $f^3$ of the shaft is, however, capable of turning freely within the hoods which serve to hold the sprocket-wheel $f^4$ in proper position notwithstanding that the shaft $f'$ may slide. The rear portion of the shaft $f'$ is provided with a collar $f^7$, formed integrally therewith or fastened rigidly thereto, and around the shaft rearward of the collar an expansive spring $f^8$ is arranged. This spring presses between the collar $f^7$ and a collar $f^9$, which is splined on the shaft $f'$ and bears against a box $f^{10}$, receiving loosely the rear extremity of the shaft $f'$ and holding the collar $f^9$ in place. The shaft $f'$ projects through the box $f^{10}$ and has a lock-nut or nuts $f^{11}$ applied thereto. The spring $f^8$ forces the shaft $f'$ and the friction-wheel $f$ forwardly to the position shown in Fig. 4, and when a pressure superior to that of the spring is applied to the wheel axially of the shaft $f'$ the spring is overcome and the shaft is forced to move axially, compressing the spring and assuming the position shown in Figs. 1 and 2. The shaft slides freely in the box $f^{10}$, and the lock-nut $f^{11}$ prevents the shaft moving forwardly beyond the position illustrated in Fig. 4.

It will be observed that the friction-wheels $d$ and $d'$ engage the friction-wheel $f$ at opposite sides of its axis. When the parts are moved to an intermediate position, (see Fig. 3,) the wheels $d$ and $d'$ are not engaged with the shaft $f'$ and the shaft $f'$ is allowed to stand stationary. When, however, the shifter $d^4$ is thrown to the position shown in Fig. 2, one of the wheels (in this instance the wheel $d$) is engaged with the wheel $f$ and the latter wheel is caused to turn. The degree or force of this engagement may of course be regulated by the movement of the shifter. In Fig. 2 the parts $d$ and $f$ are shown engaged almost, if not quite, to the greatest extent, thus driving the shaft $f'$ at the highest possible speed and also engaging the parts with such force as practically to preclude the danger of lost motion. In this connection it will be observed that the spring $f^8$ acts continuously to press the wheels together. By moving the wheel $d$ to the left from the position shown in Fig. 2, but still engaging it with the wheel $f$, a slower motion will be imparted to the latter-named wheel. This enables the entire movement of the automobile or other apparatus to which our gearing is applied to be controlled by a single lever by means of which the apparatus may be propelled forward, backward, or brought to a standstill. Also any desired speed may be given, according to the extent of the engagement of the driving friction-wheels with the driven friction-wheel. In this connection the crucial point is the relative width of the faces of the driving and the driven wheels, since by making one of these wheels wider than the other they may be relatively shifted, and at the same time the narrow wheel will bear throughout the whole of its facial surface upon the broader wheel.

Having thus described our invention, we claim as new and desire to secure by Letters Patent—

1. The combination of a drive-shaft, friction-wheels mounted thereon to turn therewith and having beveled faces inclined toward each other, means for sliding the friction-wheels on the drive-shaft, a second shaft disposed transversely to the drive-shaft and arranged to slide on and rotate in its bearings, a friction-wheel fastened to the second shaft and adapted to be engaged by either one of the first-named friction-wheels, a means pressing the second-named shaft toward the drive-shaft, and a gear mounted on the second-named shaft and turning therewith to transmit movement therefrom, the said gear being stationary with respect to the axial movement of the shaft.

2. The combination of a drive-shaft, friction-wheels arranged to be driven therefrom and movable longitudinally thereon, a second shaft running transversely to the first shaft and arranged to slide in its bearings, a friction-wheel fastened to the second-named shaft and adapted to be engaged by the first-named friction-wheels, the said second-named shaft having a portion angular in cross-section, stationary hoods into which said angular portion of the second-named shaft is movable as the shaft slides, means pressing the second shaft toward the first-named shaft, and a gear mounted on the angular portion of the second-named shaft to turn therewith, the gear being held from axial movement by the hoods.

In testimony whereof we have signed our names to this specification in the presence of two subscribing witnesses.

CHARLES M. LEECH.
SEYMOUR D. EVANS.

Witnesses:
 FRANK M. LEECH,
 CLOYD E. LEECH.